United States Patent [19]
Nicholas

[11] Patent Number: 4,913,674
[45] Date of Patent: Apr. 3, 1990

[54] LIQUID CRYSTAL DISPLAY DEVICES AND THEIR METHOD OF MANUFACTURE

[75] Inventor: Keith H. Nicholas, Reigate, England

[73] Assignee: U.S. Philips Corporation, New York, N.Y.

[21] Appl. No.: 276,729

[22] Filed: Nov. 28, 1988

[30] Foreign Application Priority Data

Dec. 16, 1987 [GB] United Kingdom ............... 8729309

[51] Int. Cl.[4] .............................................. G02F 1/03
[52] U.S. Cl. ...................................... 445/24; 430/20; 430/313; 430/319
[58] Field of Search ............... 445/24, 25; 430/20, 430/315, 316, 317, 319, 313

[56] References Cited

U.S. PATENT DOCUMENTS

| 4,678,542 | 7/1987 | Boer et al. | 430/313 X |
| 4,683,183 | 7/1987 | Ono | 430/20 |
| 4,820,222 | 4/1989 | Holmberg et al. | 445/24 |

Primary Examiner—Kenneth J. Ramsey
Attorney, Agent, or Firm—John C. Fox

[57] ABSTRACT

A method of manufacturing an active matrix addressed liquid crystal display device consisting of an array of individually controlled picture elements involves forming the electrodes after the address conductors by an autoregistration process using the address conductors to define edges of the electrodes. Opposite edges of the electrodes are thus aligned with repective facing edges of adjacent address conductors. The device's active area is thereby maximized and uncontrolled areas minimized.

6 Claims, 2 Drawing Sheets

LIQUID CRYSTAL DISPLAY DEVICES AND THEIR METHOD OF MANUFACTURE

BACKGROUND OF THE INVENTION

This invention relates to a method of manufacturing a liquid crystal display device of the kind having a matrix of individually operable liquid crystal picture elements, the method comprising the steps of forming on a transparent substrate at least one set of opaque, substantially parallel address conductors, a matrix array of individual picture element electrodes, and switching elements each of which is located adjacent a respective picture element location, and electrically connecting the picture element electrodes to the switching elements, and to the address conductors.

The invention relates also to liquid crystal display devices manufactured in accordance with such a method.

Active matrix addressed liquid crystal display devices are suitable for displaying alpha-numeric or video, for example TV information. The display devices may typically consist of a very large number of picture elements, possibly 200,000 or more.

In a known example of a liquid crystal display device suitable for displaying TV pictures and using thin film transistors, TFTs, as the switching elements, the picture elements are arranged in a matrix of rows and columns and are defined by liquid crystal material disposed between opposing substrates and by respective driving electrodes on one substrate and opposing portions of a common electrode carried on the other substrate. The TFTs are located laterally adjacent the driving electrode of their respective picture elements on the one substrate, with the drain electrode of each TFT connected to the associated driving electrode. The source electrode of all TFTs in the same column are connected to a respective one of a set of column address conductors extending between adjacent columns of picture elements to which data signals are applied. The gate electrodes of all TFTs in the same row are connected to a respective one of a set of row address conductors extending between adjacent rows of picture elements to which switching (gating) signals are applied. The device is driven by repetitively scanning the row conductors one at a time in sequential fashion so as to turn, on all TFTs in each row in turn and by applying data signals to the column conductors appropriately in synchronism for each row of picture elements in turn so as to build up a display. When the TFTs are in their on state the data signals are supplied to the associated picture element driving electrodes, thus charging up the picture elements. When the TFTs are turned off, upon cessation of the row scan signal, charge is stored in the picture elements concerned until the next time they are addressed with a row scan signal, which usually in the case of a video display is in the next field period.

Another type of known active matrix liquid crystal display device uses two-terminal non-linear elements, for example diode structures such as back-to-back diodes, diode rings or MIM (Metal-Insulator-Metal) devices, as the switching elements. As before, the picture elements are arranged in a matrix array of rows and columns. However, in these devices one set of address conductors, the row scanning conductors, is carried on one substrate and the other set of address conductors, the data column conductors, is carried on the other substrate. The picture elements are defined by individual picture element electrodes carried on one of the substrates between which address conductors extend and overlying portions of the address conductors carried on the other substrate. The individual picture element electrodes are each connected to their associated address conductor via a non-linear switching element which is arranged laterally of the electrode. The non-linear switching elements exhibit a threshold characteristic and the application of scan and data voltages to the set of address columns exceeding this threshold causes charging of the picture elements. As before, the picture elements are addressed sequentially a row at a time so as to build up a display.

Liquid crystal display devices of both types are operated in the transmissive mode whereby the individual picture elements act as shutters to control the transmission of light from a light source situated on the side of the device opposite the side where the generated display is viewed. The display devices have areas that are opaque, for example the areas occupied by the switching elements and the sets of address conductors (assuming these are formed of opaque conductive material), areas in which the intensity of transmitted light is controlled, that is active areas, determined by the areas of the picture element electrodes, and transparent areas which are uncontrolled.

The proportion of the display device's overall area that is active should be maximised to give optimum display brightness. This is particularly important in display devices intended for use in projection systems where light is directed onto one side of the device, modulated by the device in accordance with the picture to be displayed and then projected onto a display screen via a projection lens, as the physical size of the individual picture elements in such devices is comparatively small.

In use of the display devices, it has been found also that the uncontrolled transparent areas result in a general loss of contrast.

SUMMARY OF THE INVENTION

It is an object of the present invention to provide an improved active matrix addressed liquid crystal display device in which the active area of the device is maximised.

It is another object of the present invention to provide an active matrix addressed liquid crystal display device in which uncontrolled transparent areas are minimised.

According to the present invention a method of manufacturing a liquid crystal display device as described in the opening paragraph is characterised in that the picture element electrodes are formed after the at least one set of address conductors by an autoregistration process using the address conductors to define edges of the picture element electrodes.

Significant advantages are offered in using an autoregistration process to form the electrodes in accordance with the invention. In the known display devices, uncontrolled transparent areas result mainly from the fabrication processes normally adopted in forming the picture element electrodes. In a process typically used in fabrication of the known devices, the individual picture element electrodes are defined following deposition of the address conductors and fabrication of the switching element in the regions between the address conductors. Conventional photolithographic techniques are employed, in which a layer of, for example, ITO, is deposited over the address conductors and then defined using a mask. However, in this definition it is necessary to take into account usual alignment tolerances involved with this kind of process and also the need to prevent unwanted overlap between the electrode and an address conductor, as this is likely to cause undesirable capacitive effects. It is customary, therefore, to define the electrodes with their edges deliberately offset, and hence spaced a distance from the address conductors, to prevent unwanted overlap. The resulting spaces constitute uncontrolled transparent areas.

In order to block light which in operation of the device could otherwise pass through these areas and lead to loss of contrast, light masks are used. In the case of colour display devices in which individual picture elements are given particular colours by means of a colour filter mosaic consisting of red, green and blue filter elements, aligned and corresponding in size with the picture element electrodes, the light mask is in the form of an opaque grid around the filter elements, the grid covering the address conductors and adjacent areas. This light mask grid is also defined using a photolithographic process and therefore, so as to again allow for alignment tolerances, is deliberately oversized resulting in the edges of the light mask overlapping the edges of the picture element electrodes.

The use of conventional photolithographic processes, and consequently the need to allow the picture tolerances between the picture element electrodes and address conductors and between the light mask edges and the picture element electrodes, leads therefore to a loss in both the width and height of four alignment elements. Thus, there is a limit as to how far the active areas of the device can be maximised and how far the uncontrolled transparent areas can be minimised. By way of illustration, in a device having crossing sets of row and column conductors on a substrate together with the picture element electrodes and adjacent row conductors and adjacent column conductors respectively spaced apart by 60 micrometers, leaving square areas of 3,600 square micrometers available for the picture element electrodes (and ignoring for simplicity the area occupied by the switching device), then with a worst case alignment of around 2 micrometers for each of the two definitions, that is, element electrode and light mask definitions, the loss of possibly active matrix element electrode area due to the alignment tolerances amounts to approximately 900 square micrometers (four edge strips of approximately 60 micrometers by 4 micrometers). It will be appreciated that this area is around 25% of the area available to the picture element electrodes within the crossing conductors, and hence constitutes a significant loss of potential active area.

The present invention, on the other hand, enables the available areas for the element electrodes to be utilised more effectively. In using the address conductors in effect as a mask, edges of the picture element electrodes so defined are made to coincide substantially with adjacent edges of the address conductors, while it is also ensured that no unwanted overlap occurs.

With just one set of address conductors on the substrate, the facing edges of each adjacent pair of conductors serve to delimit respective and opposing edges of an element electrode therebetween such that the element electrode fills the available space between that pair of conductors, thereby maximising one dimension, that is, the height or width, as the case may be, of the element electrode and eliminating uncontrolled transparent areas in that dimension.

Even with the substrate carrying only one set of address conductors therefore, it is seen that the invention offers a significant improvement. Although conventional definition techniques as used previously to define the entire electrode may be used to define the opposing edges of the electrode in the other dimension, maximisation of the one dimension will result in a greater active area leading to higher brightness. Moreover, light mask elements extending in the direction of the one set of address conductors become unnecessary.

In the kind of display using two sets of crossing address conductors, i.e. row and column conductors on one substrate even greater benefits are obtained. In this case, facing edges of adjacent pairs of conductors of both sets may be used to define the edges of a picture element electrode formed therebetween. Thus the four edges of the two pairs of conductors concerned may serve to delimit the four edges of the electrode so that the two dimensions of the electrode, that is, both height and width, are maximised and coincide substantially with the conductor edges, with the element electrode practically filling the available space completely.

By using this method, therefore, maximum active area is achieved. Moreover any uncontrolled transparent areas caused by gaps being present between the element electrode and the address conductors is eliminated and a light mask is no longer necessary.

With certain kinds of switching elements which exhibit photoconductive characteristics, for example polysilicon TFTs, a small area light shield covering each switching element in a known manner may be required.

In a preferred embodiment of the invention, forming the picture element electrodes comprises the steps of depositing a transparent conductive layer, for example of ITO, over the substrate over the at least one set of address conductors, and preferably but not necessarily, the switching elements formed thereon; coating the transparent conductive layer with negative photoresist; and directing exposing radiation through the substrate towards the photoresist. The address conductors, and-/or switching elements, being opaque to this radiation, shield overlying portions of the photoresist from exposure. The photoresist is then developed so that unexposed portions of the photoresist are removed and the underlying portions of the transparent conductive layer are then removed by etching in a known manner. The exposed photoresist is subsequently stripped away by etching to leave discrete areas of the conductive layer, constituting the picture element electrodes with edges in registration with edges of the address conductors and switching elements.

In order to establish contact between the picture element electrodes and a terminal of their associated switching devices, when provided prior to forming the electrodes, the method may include the further step following coating with the photoresist of exposing selected portions of the photoresist, corresponding with the desired contact areas, to radiation from the side of the substrate on which the address conductors are carried, either before or after the aforementioned exposure from the other side, using a mask. During the subsequent processing operation, the portions of the conductive layer underlying these exposed portions of the photoresist are retained.

Although it has been mentioned previously that overlap between a picture element electrode and an address conductor generally is undesirable in view of the capacitive effects caused, in certain circumstances, however, it can in fact be useful to have a controlled amount of overlap between each picture element electrode and a scanning address conductor of the preceding row for charge storage purposes. If this is required, the necessary overlapping part of the picture element electrodes can be defined at the same time as the aforementioned contact areas using an appropriately configured mask to expose both contact portions and overlapping parts.

With an active matrix display device of the kind using two terminal non-linear switching elements such as diode structures, in which the sets of row and column address conductors are formed on respective substrates, the edges of the picture element electrodes not autoregistered with the one set of conductors may be defined using a conventional photolithographic process at the same time as the contact portions and, if used, the overlapping parts are formed. Alternatively, these other edges may be defined during the autoregistration step using a mask to define these edges when illuminating the photoresist through the substrate.

BRIEF DESCRIPTION OF THE DRAWINGS

A method of manufacturing a liquid crystal display device, and a liquid crystal display device produced thereby, in accordance with the present invention will now be described, by way of example, with reference to the accompanying drawings, in which.

DESCRIPTION OF THE PREFERRED EMBODIMENTS

Figure 1:
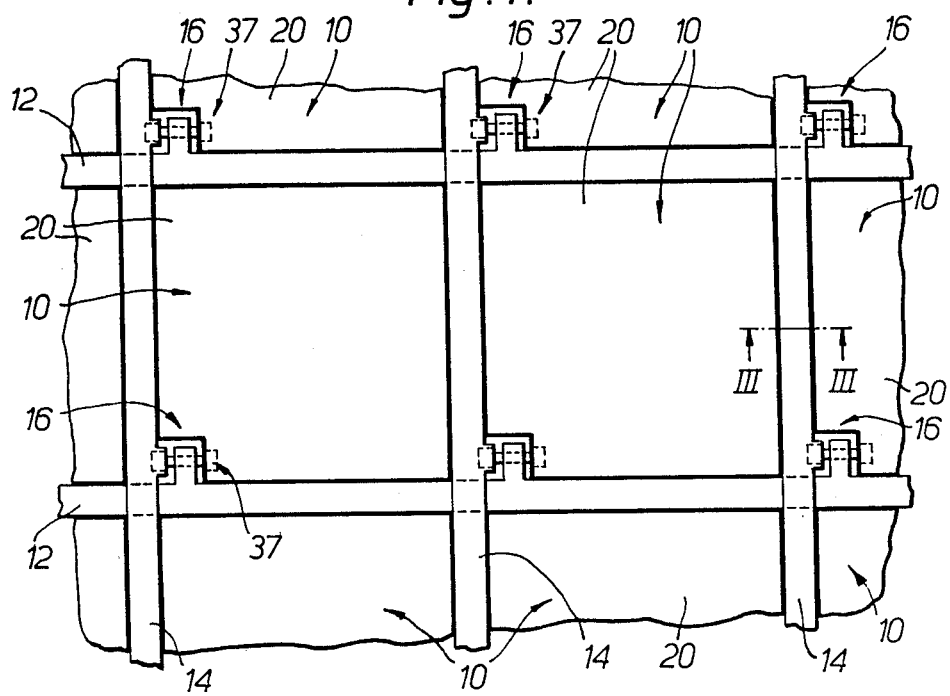
FIG. 1 is a diagrammatic plan view of part of one embodiment of the finished liquid crystal display device showing a number of typical picture elements together with their associated switching elements and row and column address conductors.

Referring to FIG. 1, a liquid crystal display device which is suitable for displaying TV pictures, comprises a row and column array of individual, generally square shape, picture elements 10, only a few of which are shown for simplicity in the figure. In practice, the total number of picture elements may be 100,000 or more. The picture elements are situated in areas between a set of parallel row address conductors, 12, and a set of parallel column conductors, 14, with each element being bounded by portions of respective adjacent pairs of row and column conductors. Each picture element is connected to a respective row and column conductor by a switching element which in this case is a thin film transistor (TF) 16 located adjacent the intersection of the row and column conductors concerned, and via which the picture element is addressed.

The gate electrodes of all TFTs 16 associated with picture elements in the same row are connected to the same row conductor 12 to which, in operation of the device, switching (gating) voltage signals are applied. The source electrodes of TFTs 16 associated with picture elements in the same column are connected to the same column conductor 14 to which video data signals are supplied. The drain electrodes of the TFTs are each connected to a respective picture element electrode 20 forming part of, and defining the area of, the associated picture element.

The row and column address conductors 12 and 14, the TFTs 16 and the picture element electrodes 20 are all carried on a transparent substrate of the display device. A common counter electrode, not visible in FIG. 1, associated with all the picture elements 10, is carried on a further transparent substrate extending parallel to, and spaced from this substrate with TN liquid crystal material disposed therebetween. The opposing substrates are provided with polariser and analyser layers in a known manner.

The operation of this kind of display device is generally well known and as such will not be described here in detail. Briefly, however, the liquid crystal material serves to modulate light through the device depending on a voltage applied thereacross, with each picture element 10 being individually operable to vary light transmission through the device in accordance with a drive voltage applied across its electrodes. Colour filter elements in registration with the picture elements are carried on the further substrate produce a full colour display using tri-colour additive principles.

Row addressing of the array of picture elements is achieved by applying a gating signal to a row conductor 12. This turns on all TFTs in that row. The device is driven on a row-at-a-time basis by scanning the row conductors with a gating signal sequentially so as to turn on all TFTs in each row in turn. Video data signals are applied to the column conductors 14 for each row of picture elements in turn in synchronism with the gating signals, these data signals being transferred to the appropriate row of picture elements via the on TFTs of that row. During the remainder of the field period the TFTs in that row are off, and their function is to keep the video data voltage across the associated picture elements by virtue of the natural capacitance of the elements. By addressing each row of picture elements in turn, a complete TV picture is built up.

Referring to FIGS. 2a to 2e, a method of manufacturing the display will now be described. In this particular device example, the switching elements comprise a type of polysilicon TFT but it will be appreciated that other forms of switching elements may be used instead, as will be apparent to persons skilled in the art. While FIGS. 2a to 2d for the sake of simplicity only illustrate the fabrication of a typical one of the picture elements and associated switching element, it should be understood that the other picture and switching elements of the array can be formed simultaneously using the described process steps.

A layer of polysilicon is deposited by a low pressure chemical vapour deposition technique onto a transparent substrate 25 of glass or quartz and defined into discrete regions 26 photolithographically using a patterned mask. A covering gate oxide layer 27 of silicon dioxide is grown by thermal oxidation. Alternatively, the gate oxide 27 may be deposited as a separate layer.

A further layer of polysilicon or metal is then deposited and defined to leave a region 28 eventually forming the TFT's gate. In the case where metal is used, this definition stage is also used to define from the deposited metal a bridging portion (not visible) extending from this region in a direction perpendicular to the plane of the paper, leading to a strip-shaped portion which constitutes a row conductor 12 extending parallel to the plane of the paper, and which has along its length similar bridging portions connecting gate defining portions of other switching elements in the same row.

Figure 2:
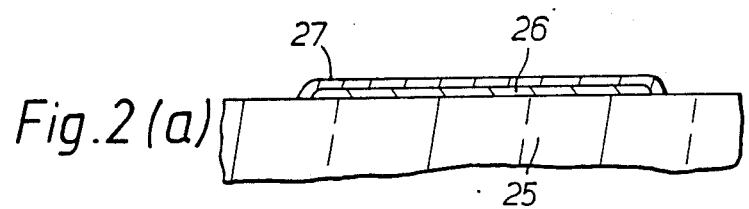
FIGS. 2a to 2e are cross section views which illustrate diagrammatically various stages in the fabrication of the liquid crystal display device.
Figure 2:
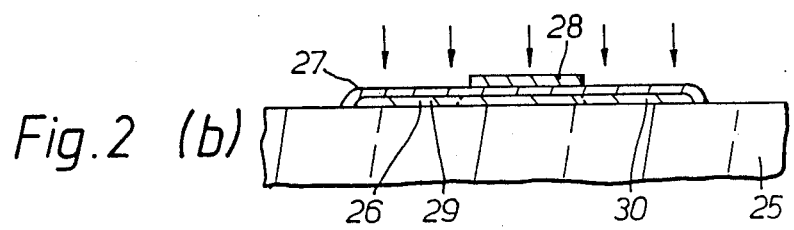
Figure 2:
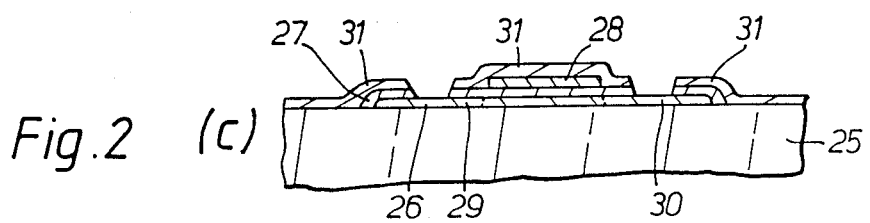
Figure 2:
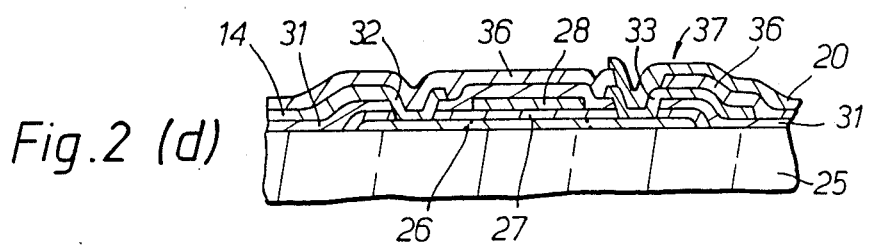
Figure 2:
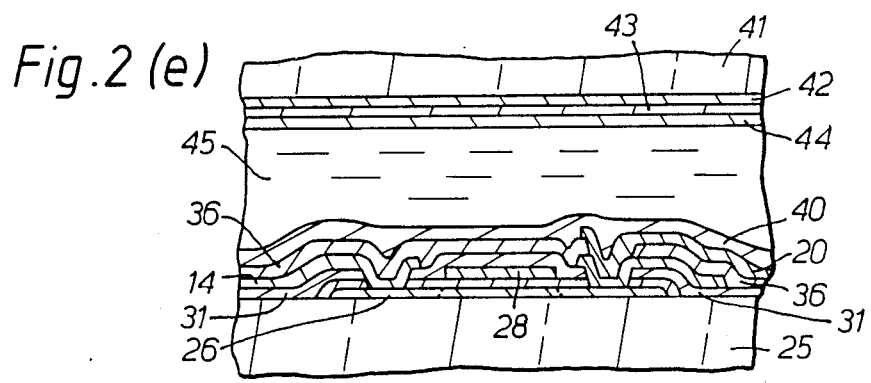

The structure is then subjected to a phosphorus implant operation, as depicted by the arrows in FIG. 2b, to create source and drain regions 29 and 30 respectively, in the polysilicon layer 26, and the structure is then annealed.

Where polysilicon is used to form the gate 28, this operation is followed by the deposition and subsequent definition of a metal layer, for example aluminium, to form the row conductor and integral bridging portions to the gates of all TFTs in the same row.

The surface of the structure is then covered with an insulative silicon dioxide layer 31.

After subjecting the structure to a hydrogen plasma annealing operation, contact holes are opened through the two silicon dioxide layers 31 and 27 over the source and drain regions 29 and 30 as shown in FIG. 4c, by photoetching using a mask.

A further metal layer, for example aluminium, possibly with an overlying chromium buffer layer, is then deposited and defined using a photolithographic process to form (as shown in FIG. 4d) source and drain electrodes 32 and 33 and, integral with the source electrode 32, a strip constituting the column conductor 14 extending in a direction perpendicular to the paper and similarly connected to the source electrodes of other TFTs in the same column.

Another insulative layer, 36, of silicon dioxide is then deposited over the surface of the structure and a window opened photolithographically in this layer over the drain electrode 33.

Having thus formed on the substrate 25 the TFTs 16 and the row and column address conductors 12 and 14, the picture element electrodes 20 are then formed by means of an autoregistration process using the row and column conductors 12 and 14 to define edges of the picture element electrodes. A layer of transparent indium tin oxide (ITO) is first deposited over the structure, followed by a layer of negative photoresist. U-V radiation is then directed from beneath the structure and through the substrate 25 towards the photoresist. As such, those areas of the photoresist directly overlying the opaque row and column conductors 12 and 14 and the TFT structures remain unexposed.

In order to obtain contact between the eventual picture element electrodes 20 and the drain electrodes 33, and also, if desired a region of overlap between the picture element electrodes and adjacent portions of the row conductors associated with the immediately preceding row of picture elements to form controlled capacitors for charge storage purposes, the photoresist is exposed selectively in a conventional manner, using a mask above the structure to permit UV radiation at areas corresponding to the required locations of the contact areas and the overlap areas, the former being indicated at 37 in FIGS. 1 and 2(d).

The photoresist is then developed to remove the unexposed portions of the photoresist and the underlying portions of the ITO layer are then removed by etching conventionally to leave the desired pattern of ITO areas defining the picture element electrodes 20, the contact areas between the electrodes 20 and the TFT drain electrodes 33 and, if required, the aforementioned overlap areas.

Thereafter the remaining photoresist is stripped away.

Lead-in tracks connecting contact pads at the edge of the substrate to the column and row conductors may be formed from the ITO layer, those tracks being defined at the same time as the contact areas are defined.

Figure 3:
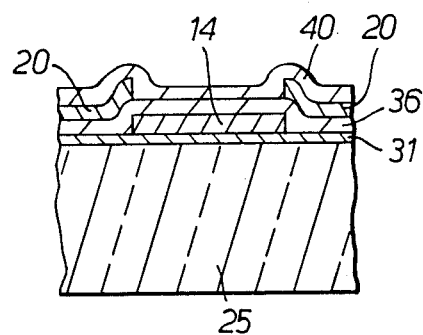
FIG. 3 is a cross sectional view taken along the lines III—III of FIG. 1.

By autoregistering the picture element electrodes in the above manner using the row and column conductors to form aligned electrode edges, it will be understood that the so-defined picture element electrodes 20 fill completely, except at the region of the TFTs 16, the spaces between adjacent pairs of row conductors 12 and column conductors 14, with the edges of the electrodes 20 both widthwise and heightwise coinciding with the facing vertical and horizontal edges respectively of the pairs of row and column conductors, as illustrated for example, in the section view shown in FIG. 3.

Hence the picture element electrodes 20 occupy fully the available spaces, thereby maximising the active area of the picture elements.

The shape of the picture element electrodes 20 in the region of the TFTs 16 is shown greatly simplified in FIG. 1. It will be understood that the edge of the electrode at this region follows the shape of the opaque TFT structure.

A passivation and alignment layer 40 is deposited over the surface of the structure as shown in FIG. 2e to complete this part of the device. The substrate 25 is then assembled with a further transparent substrate 41 carrying the common electrode, here referenced 42, a colour filter mosaic 43 and a further passivation and alignment layer 44 in the known manner. Liquid crystal material 45 is introduced into the space between the two substrates to complete the device.

The resulting structure has increased controlled transmission compared with that obtained with known devices and virtually eliminates stray light, leading to improved brightness at maximum contrast.

A similar method to that described above can be used in the fabrication of the kind of active matrix liquid crystal display device using two terminal non-linear switching elements such as diode structures as switching elements and in which the sets of row and column conductors are carried on respective substrates.

In this method one set of parallel conductors, for example the column conductors, are formed on one substrate together with the diode structures, for example diode rings or MIMs, connected thereto in conventional manner. As before, this is followed by a layer of ITO and then a layer of negative photoresist. The structure is illuminated from beneath UV radiation so as to expose those regions of the photoresist not shielded by the opaque set of conductors and switching elements. A mask may be used in this process to define the other edges of the eventual picture element electrodes not defined by autoregistration using the set of column conductors or alternatively these other edges may be defined subsequently by a separate conventional photolithographic process using a mask above the surface of the substrate.

Contact areas between the electrodes and the switching elements are defined, as before, by exposure through a mask from above the substrate.

Thereafter, the same process is used to develop and remove unwanted regions of the ITO layer.

By this method, therefore, the size of the picture elements in one dimension, in this example the width, is maximised with the edges of each picture element electrode in this dimension coinciding with facing edges of an adjacent pair of column conductors. Thus an increase in the controlled transmission area over known devices and the elimination of some uncontrolled transparent areas producing stray light is still obtained, leading to improved brightness at increased contrast.

In a modification of the above described method, a lift-off technique may be employed. Referring to the method described with regard to FIGS. 2a to 2e, the same process steps are used to form the row and column conductors and switching elements on the one substrate. Over the final layer 36 of silicon dioxide, a layer of positive photoresist is deposited which is then illuminated with UV radiation from beneath the substrate so that those regions of the photoresist not shielded by the opaque conductors 12 and 14 or the TFT structures are exposed. These exposed regions are then removed by developing down to the underlying silicon dioxide layer 36, so that only portions of the photoresist lying directly over the conductors and switching elements remain. The surface of the structure is then coated with a layer of ITO and the structure processed to remove the remaining portions of photoresist, this being possible because of pin hole defects in the ITO layer allowing penetration therethrough of the removal agent.

Removal of the remaining portions of the photoresist results in the overlying regions of the ITO layer also being removed in a manner as is known with such lift-off processes, these regions in practice being washed away with the photoresist. As a result, regions of the ITO layer autoregistered with the row and column conductors remain, constituting the picture element electrodes.

As before, contact areas between the switching elements and picture element electrodes are defined by conventional photolithographic processes, using a mask from above to expose the contact areas, this being accomplished prior to developing and etching of the photoresist.

Again, therefore, picture element electrodes autoregistered with the row and column conductors are obtained. In this modified process it is not necessary for the picture element electrodes to be of transparent material, and therefore opaque conductive materials may instead be employed, enabling a reflective mode rather than transmissive mode display device to be produced.

I claim:

1. A method of manufacturing a liquid crystal display device of the kind having a matrix of individually operable liquid crystal picture elements, comprising the steps of:
   (1) forming on a transparent substrate two sets of opaque substantially parallel address conductors with the one set extending substantially at right angles to the other set to provide row and column conductors;
   (2) forming a matrix array of individual picture element electrodes;
   (3) forming switching elements adjacent a respective picture element location; and
   (4) providing interconnections electrically connecting the picture element electrodes to the switching elements, via which the picture element electrodes are connected to the address conductors,
   characterized in that the picture element electrodes are formed after the address conductors by a self-alignment process using the facing edges of adjacent address conductors to define the edges of the picture element electrodes, by a photolithographic process.

2. A method according to claim 1, in which the switching elements comprise thin film transistors.

3. A method according to claim 1, in which the switching elements are fabricated on the substrate prior to the picture element electrodes being formed.

4. A method according to claim 3, in which the picture element electrodes are formed by depositing a transparent conductive layer on the substrate over the address conductors formed thereon, coating the transparent conductive layer with negative photoresist material, directing exposing radiation through the substrate towards the photoresist material, and removing unexposed portions of the photoresist material and underlying portions of the transparent conductive layer.

5. A method according to claim 3, in which the picture element electrodes are formed by depositing photoresist material on the substrate with the address conductors formed thereon, directing exposing radiation through the substrate towards the photoresist material, removing exposed portions of the photoresist material, depositing a conductive layer over the surface of the structure, and then removing the remaining unexposed photoresist material and the overlying portions of the conductive layer.

6. A method according to claim 4 or claim 9, in which following coating with the photoresist material, selected portions of the photoresist are exposed through a mask to exposing radiation from the side of the substrate on which the address conductors are formed, to define corresponding portions of the conductive layers serving as contact areas for contact with terminals of the switching elements.

* * * * *